United States Patent Office 2,930,821
Patented Mar. 29, 1960

2,930,821

RECOVERY OF HIGH PURITY INDENE BY CHROMATOGRAPHIC FRACTIONATION AND FRACTIONAL DISTILLATION

Edward J. Schwoegler, Munster, and Richard E. Putscher, Hammond, Ind., assignors, by mesne assignments, to Neville Chemical Company, Pittsburgh, Pa., a corporation of Pennsylvania No Drawing. Application November 29, 1955
Serial No. 549,876

7 Claims. (Cl. 260—674)

This invention relates to a process for recovering high purity indene by chromatographic fractionation and fractional distillation. More particularly, it relates to the recovery of high purity indene by multiple successive chromatographic fractionation followed by fractional distillation.

Indene is found in the tars from coal, lignite and the like and is also manufactured by passing tetrahydro-naphthalene over silica-alumina catalysts at high temperatures, for example, about 670° C. The commonest source is from coal tar naphthas. Substantially all of the indene in the coal tar may be concentrated in a naphtha fraction boiling in the range of about 160° to about 200° C. The indene content of such fractions may vary substantially depending in part upon the source of the naphtha and in part upon the sharpness of the cut but usually ranges from about 35% to about 70% by volume. It is possible to produce a fraction containing about 75% of indene by fractional distillation but such a fraction contains only about 20% of the indene present in the tar. This represents an undue loss of valuable components and hence it is desirable to devise methods whereby indene of greater purity and representing a higher proportion of that available can be produced.

Indene-containing naphtha fractions falling within the aforementioned boiling range contain a variety of rather close boiling components which make it impractical or impossible to produce indene in the degree of purity desired. One of the major uses of indene is in the production of resins such as the coumarone-indene resins which are widely used for coatings and other purposes. The production on a commercial scale of high purity indene would make possible the production of valuable derivatives of indene which is not now practical because of the present inavailability of high purity indene in commercial quantities.

We have devised a method whereby a greater proportion of available indene of higher purity can be produced than was heretofore possible, at least on a practical scale.

In a copending application entitled "Chromatographic Separation of Indene," Serial No. 549,877, filed concurrently herewith, we have described a method comprising subjecting indene containing naphtha to a chromatographic fractionation over a suitable adsorbent such as silica gel, activated alumina, activated carbon and the like to obtain a fraction rich in indene. Thereafter, the said fraction may be subjected to a second chromatographic fractionation to produce a further purification, and the second said fraction may be subjected to a further chromatographic fractionation to produce a product of high indene content which represents a high recovery of available indene originally present in the naphtha.

We have discovered that if naphtha fractions which have been subjected to chromatographic fractionation are fractionally distilled, high percentages of the indene originally present can be obtained as a substantially pure product. In addition, high purity products such as methyl benzenes, indane, coumarone, methyl-coumarone, benzonitrile and pyridines such as methyl-pyridines can be obtained.

Among the adsorbents which may be used, activated silica gel is preferred. Activated alumina is useful although not entirely equivalent to activated silica gel. Various grades of activated carbon of the adsorbent variety may also be employed.

While the operation is normally carried out by percolating the naphtha through a fixed bed of the adsorbent, various continuous methods may also be employed.

The invention will be described in connection with the use of silica gel but it will be evident as to how other suitable adsorbents may be used in place thereof. It will also be described in connection with a fixed bed operation.

The adsorbent may be of any suitable mesh size, for example, 10 to 200 mesh or finer. It is usually packed evenly in a vertical column of suitable dimensions to obviate channeling. In order to facilitate the wetting of the adsorbent by the naphtha, petroleum ether (B.P. 30–60° C.), or other low boiling saturated hydrocarbon which is readily displaceable from the adsorbent by the naphtha components, is passed through the column until the gel is evenly wetted. This step is not essential but is helpful in obtaining even wetting of the adsorbent by the naphtha.

The indene-containing naphtha which has been previously fractionated to the desired boiling range and which preferably contains the major portion of the indene present in the coal tar, is passed through the column. It is preferred that the boiling range of the naphtha be as narrow as possible, consistent with the maximum recovery of indene from the tar. Usually this is within the range of 160° to 190° or 200° C. The naphtha constituents, being much more readily adsorbed than the petroleum ether, displaces it so that the first material through the column is the petroleum ether with which the bed was originally wetted. The petroleum ether can be recovered as a separate fraction and purified if desired by fractional distillation since its boiling range is far below that of the naphtha. The course of the fractionation is conveniently followed by determining the refractive index of the material coming through the column. Other methods could, of course, be used.

The naphtha is passed through the column and when the refractive index of the effluent reaches a predetermined value, the flow is stopped. The remaining material is eluted or desorbed, for example with another organic liquid which is preferentially adsorbed and hence displaces the adsorbed components of the naphtha. The eluting liquid is chosen so as to be readily recovered for example by solvent extraction or by distillation. A low boiling aromatic such as benzene may be used. Other materials include polar compounds such as a lower alcohol, e.g. methanol, ethanol or the like to which some water may be added to increase the polarity of the mixture and enhance its eluting power. Carbon tetrachloride or other halogenated hydrocarbon boiling in a different range from the naphtha may be employed, as may dioxane, nitrobenzene, etc. Steam may be used, particularly to remove the eluting or desorbing agent liquids from the adsorbent.

Alternatively, more than one eluent may be employed. For example benzene may be used first, followed by ethanol. The naphtha contains certain non-hydrocarbons such as coumarone, methyl coumarone, methyl pyridines and benzonitrile which are strongly adsorbed and not readily displaceable by non-polar eluents. By following this procedure these can be readily recovered and separated by, for example, fractional distillation.

As the eluting liquid passes downward through the column the adsorbed components of the naphtha are displaced.

The first components leaving the column are largely saturated hydrocarbons having the lowest refractive index. This is followed by fractions predominantly cyclic, first naphthenics and then aromatics which are largely trimethyl benzenes, which latter fraction contains indane if it is present. The first fractions contain little or no indene. There is a gradual increase in indene content. When the refractive index reaches a value of about 1.49 an intermediate fraction is usually recovered containing between 30% and 40% indene. This fraction contains indane if it is present. The fraction may be reprocessed separately or in combination with the naphtha charge to recover additional indene. The indene content of subsequent fractions gradually increases. It is possible to recover about 20% of the indene content of a naphtha (40% indene content) of about 80% purity by a single chromatographic treatment. Over 50% can be recovered of 76% purity in the same way. By subjecting the indene-rich fraction to fractional distillation in a high efficiency column having say 50 to 100 theoretical plates, 60% of the indene in the naphtha can be recovered having 95% or greater purity. By contrast only 20% of the indene of 75% purity can be recovered by fractional distillation alone.

An undistilled high indene-content fraction from the first chromatographic fractionation, for example, the 76% fraction just referred to or a fraction containing 60–70% indene and representing a correspondingly larger proportion of the original naphtha, may be subjected to a second chromatogram.

By this means more than 20% of the original indene content can be recovered at 88% purity, or more than 40% of 80% purity. Fractional distillation of a rich fraction from the second chromatographic treatment yields substantially pure indene.

The rich fraction from the second chromatogram may be subjected to a third chromatogram, and in this way 65% of the original indene content of 85% purity can be obtained. About 25% of the original indene content can be recovered having about 90% or more purity. The refractive indices of the cuts making up this fraction range from about 1.552 to about 1.569. The rich fraction from the third chromatogram is fractionally distilled and yields practically pure indene amounting to 60% or more of the indene in the original naphtha.

The final or "bottoms" fraction from each of the chromatograms contain substantial quantities of non-hydrocarbons. These are best displaced from the adsorbent by eluents such as a lower alcohol or a halogenated hydrocarbon. Such fractions may be subjected to a separate chromatographic fractionation. A small fraction, apparently largely composed of methyl pyridines, was the first to be separated. The major portion of the bottoms, representing about 70–80% is next obtained. This can be fractionally distilled to recover as separate products, coumarone, indene and methyl-coumarone in amounts which vary depending on the naphtha. Upon distilling such a fraction from a representative coal tar naphtha three products were obtained, namely coumarone (50% of the fraction), indene (30%) and methyl-coumarone (7%), which were of high purity.

The last fraction amounting to about 21% of the bottoms was distilled. The predominant product was benzonitrile (≅77%), the remainder being largely higher boiling oils and tar.

The proportions of these components recovered from the original naphtha were coumarone 2.2%, benzonitrile 1.3% and methylcoumarone 0.5%.

The amount of material passed into the column per unit weight of silica gel may vary considerably depending upon the subsequent steps to be employed, the percentage of indene in the naphtha, the nature of the non-indene components, and the degree of purity desired in the indene containing fraction. According to one embodiment the naphtha charge is stopped when the refractive index taken at 25° C. reaches about 1.500. The material which has come through the column at this point comprises a small amount of residual petroleum ether and most of the saturated hydrocarbons contained in the original naphtha. The eluting liquid is then charged to the column.

The next fraction recovered has a refractive index between 1.526 and about 1.540 and contains considerable amounts of indene of the order of 30% to 40%. If indane is present most of it appears in this fraction, the remainder is largely trimethyl benzenes. This material is collected separately and may be subjected to further chromatographic separation. In this way additional concentration of the indene and further recovery can be had of that available.

Alternatively, the intermediate fraction may be fractionally distilled to remove a major portion of the methyl benzenes and to recover indene of relatively high purity.

Material having a refractive index of about 1.541 to about 1.551 is recovered and is subjected to a second chromatographic fractionation conducted as previously described. The heart cut of this material is then recovered and this in turn is subjected to a third chromatographic fracitonation.

Depending upon where the heart cut is taken the bottoms fraction from each of the chromatograms may contain a high proportion of indene (up to, say 60%) in addition to other hydrocarbon and non-hydrocarbon components. Much of the indene from these fractions can be recovered by subjecting them, either separately or as a combined fraction, to chromatographic fractionation. This can be fractionally distilled to obtain substantially pure indene.

In a like manner, intermediate fractions taken just prior to the heart cut and containing 30–60% indene, can be reprocessed either separately or as a combined feed. The indene-rich fraction can be distilled to obtain substantially pure indene.

The heart cuts from the chromatographic fractionation of either the intermediate or bottoms fractions can be recovered as such or either, or both can be added to the charge to the third chromatogram of the series conducted on the original naphtha. The indene rich-fraction of this step is distilled to obtain substantially pure indene.

While more than three separations can be used, there appears to be little to be gained as a practical matter.

The flow of eluent is continued until substantially no further naphtha components are found in it. This point is reached when the refractive index of the effluent is substantially the same as that of the eluent being used. Any naphtha components dissolved in the eluent can be recovered by fractional distillation.

The eluent may be displaced from the adsorbent by passing an inert gas therethrough usually at an elevated temperature of say 150–250° C. Steam is satisfactory although nitrogen or carbon dioxide, or low boiling hydrocarbons such as methane, ethane, propane, butane, etc., may be used. It is preferred not to use an oxygen containing gas both because of fire hazard and because of the adverse effect of any adsorbed oxygen on the indene. After the eluent is removed, the adsorbent is cooled and is ready for reuse.

In carrying out the adsorption operation, whether one or more steps are employed, a series of columns may be used, some being in use while others are being regenerated. The columns are usually jacketed so that a cooling medium can be passed therethrough during the adsorption step and a heating medium passed through during regeneration.

The operation is preferably carried out at room temperature, say 20–30° C. or below. Because of the heat of adsorption it is necessary to cool the column to prevent the temperature from rising. In general, the fractionation is more effective at low temperatures.

In some instances, particularly when the indene content is high, say 75–90%, it is desirable to dilute the naphtha prior to contact with the adsorbent to about 40–60% indene concentration with a low boiling hydrocarbon such as pentane, hexane or the like, or with petroleum ether. These appear in the first fractions through the column and can be recovered in a subsequent distillation step, or can be reused for dilution purposes.

The fractional distillation can be carried out in any efficient apparatus wherein a close fractionation can be obtained. It may be carried out at atmospheric pressure or at reduced pressures. It may be either batch or continuous.

We are not certain as to why the improved effects are obtained in the process whereby such a large recovery of pure or substantially pure indene is accomplished. It is a fact that the individual constituents of the naphtha fraction boil close together. It is possible that some of these form constant boiling mixtures with other components, and that the chromatographic separation removes part of these so that the balance is upset, permitting sharp separation by distillation. We do not believe that such an effect could be anticipated from what has been taught in the prior art.

The following example shows results that were obtained by subjecting a typical coal tar naphtha to single and multiple successive chromatographic separation. Table I shows the distillation characteristics of the fraction using a 25 plate column, a reflux ratio of 10:1 at 750 mm. pressure and at 100 mm. pressure. Table II shows physical and chemical constants of the naphtha fraction.

TABLE II

*Chemical and physical constants of coal tar naphtha fraction*

| | Value |
|---|---|
| Refractive index ($n_D^{25}$) | 1.5372 |
| Density ($d_4^{25}$) | 0.9455 |
| Bromine number [1] | 78 |
| Sulfur content (lamp) | 0.10 |
| Nitrogen content | 0.14 |

[1] Bromide-bromate method in glacial acetic acid.

EXAMPLE I

The naphtha fraction (350 grams) was passed through an eight foot column approximately 45 mm. in diameter which was firmly packed with 2400 grams of minus 200 mesh activated silica gel which had been pre-wetted with petroleum ether. The results are shown in Table III.

TABLE III

*Chromatography of the coal tar naphtha fraction over silica gel*

| Fraction | Volume ml. | Volume Percent | $n_D^{25}$ | $d_4^{25}$ | RI [1] | Bromine No. | Indene, Percent |
|---|---|---|---|---|---|---|---|
| A (PE) [2] | 19.3 | 5.5 | 1.4430 | 0.7929 | 1.0466 | 5.9 | |
| D$_1$ | 73 | 20.9 | | | | | 30 |
| D$_2$ | | | 1.5165 | 0.9011 | 1.0661 | 33.2 | |
| D$_3$ | | | 1.5446 | 0.9445 | 1.0723 | | |
| D$_4$ | 233 | 66.6 | 1.5451 | 0.9459 | 1.0721 | | |
| D$_5$ | | | 1.5586 | 0.9894 | 1.0639 | | |
| D$_7$ | 15.0 | 4.3 | 1.5510 | 1.0194 | 1.0413 | 53 | |
| Loss | | 2.7 | | | | | |

[1] Refractivity intercept ($n_D^{25} - \frac{1}{2} d_4^{25}$).
[2] Petroleum ether.

Fractions D$_3$ to D$_7$ were distilled in a 100-plate Podbielniak column and fractionated at 100 mm. pressure at a take-off rate of 30 ml./hr. The results are shown in Table IV.

TABLE IV

*Fractional distillation of chromatographic fractions D$_3$ to D$_7$*

| Fraction | Boiling Point,[a] °C. | Volume ml. | Volume percent | Vol.,[b] percent | $n_D^{25}$ | $d_4^{25}$ | RI [c] | Bromine No. | Indene, percent |
|---|---|---|---|---|---|---|---|---|---|
| 1 | 158–176 | 50.8 | 23.1 | 15.4 | 1.5247 | 0.9315 | 1.0589 | 30.5 | |
| 2 | 176–180 | 31.0 | 14.1 | 9.4 | 1.5502 | 0.9699 | 1.0652 | 77 | 39 |
| 3 | 180–183 | 121.7 | 55.3 | 36.8 | 1.5666 | 0.9853 | 1.0739 | 126 | 85 |
| Bottoms | 183+ | 16.5 | 7.5 | 5.0 | | | | | |

[a] Calculated to 760 mm.
[b] Based on original coal tar naphtha fraction.
[c] Refractivity intercept.

TABLE I

*Distillation data on coal tar naphtha fraction*
[25-plate column; reflux ratio 10 to 1.]

| Fraction | 750 mm. Vapor Temp., °C. | 750 mm. Wt. Percent | 750 mm. $n_D^{25}$ | 100 mm. Vapor Temp., °C. | 100 mm. Wt. Percent | 100 mm. $n_D^{25}$ |
|---|---|---|---|---|---|---|
| 1 | 135–160 | 1.1 | 1.4944 | 97–101 | 4.3 | 1.5000 |
| 2 | 165 | 2.5 | 1.5025 | 104 | 6.2 | 1.5085 |
| 3 | 170 | 18.7 | 1.5158 | 107 | 13.8 | 1.5185 |
| 4 | 175 | 29.9 | 1.5327 | 109 | 13.9 | 1.5288 |
| 5 | 177 | 9.6 | 1.5475 | 111 | 10.6 | 1.5390 |
| 6 | 178 | 8.2 | 1.5526 | 112 | 4.8 | 1.5450 |
| 7 | 179 | 12.7 | 1.5562 | 113 | 11.1 | 1.5507 |
| 8 | 180 | 4.5 | 1.5561 | 114 | 15.6 | 1.5570 |
| 9 | 181 | 0.9 | 1.5508 | 115 | 12.0 | 1.5584 |
| 10 | 185 | 0.9 | 1.5422 | Residue | 6.1 | 1.5410 |
| 11 | 189 | 1.9 | 1.5300 | | | |
| Residue Heavy oil | | 3.0 | | | | |
| Resin | | 4.3 | | | | |
| Total Recovery | | 98.2 | | | 98.4 | |

Fraction 3 accounted for 78% of the indene in the original naphtha and was of 85% purity. The material charged to the fractional distillation step contained the bulk of the indene and this amounted to 70.9% by volume of the original naphtha.

A similar experiment was carried out with the exception that a higher reflux ratio was employed and in this way a product containing 95% indene and accounting for about 60% of the indene in the original naphtha fraction was obtained. The refractive index of this 95% purity fraction was 1.5710 and its melting point was minus 4.5° C.

EXAMPLE II 1200 grams of the above naphtha fraction were passed through 6.5 kilograms of 200 mesh activated silica gel, prewetted with petroleum ether (B.P. 30–60° C.). The fractionation was conducted in two columns. The fractions were eluted with benzene until the material coming through the column had a refractive index substantially that of pure benzene. A final elution was then made with 95% ethanol. The results of the chromatograms are shown in Tables V and VI and demonstrate the consistency of the method.

TABLE V

Chromatographic fractionation of the coal tar naphtha fraction over silica gel

| Cut No. | Volume Percent | | $n_D^{25}$ | $d_4^{25}$ | RI [1] | Indene [2] Content, Percent |
|---|---|---|---|---|---|---|
| | Cut | Accum. | | | | |
| 1 | 4.0 | | | | | Naphthenes |
| 2 | 1.0 | 5.0 | 1.45284 | 0.8382 | 1.0337 | |
| 3 | 19.5 | 24.5 | 1.49292 | 0.8637 | 1.0611 | |
| 4 | 14.0 | 38.5 | 1.51877 | 0.9042 | 1.0667 | 32 |
| 5 | 5.0 | 43.5 | 1.54192 | 0.9413 | 1.0713 | 60 |
| 6 | 6.5 | 50.0 | 1.54900 | 0.9523 | 1.0729 | 69 |
| 7 | 9.8 | 59.8 | 1.55738 | 0.9653 | 1.0747 | 79 |
| 8 | 30.0 | 89.8 | 1.56217 | 0.9886 | 1.0679 | 80 |
| 9 | 7.0 | 96.8 | 1.55726 | 1.0184 | 1.0481 | 60 |
| Loss | 3.2 | | | | | |

[1] RI = Refractivity intercept ($n_D^{25} - \frac{1}{2} d_4^{25}$).
[2] By calculation from refractivity intercept.

TABLE VI

Chromatographic fractionation of the coal tar naphtha fraction over silica gel

[800 g. fraction sample.]

| Cut No. | Volume Percent | | $n_D^{25}$ | $d_4^{25}$ | RI [2] |
|---|---|---|---|---|---|
| | Cut | Accum. | | | |
| 10 | 4.6 | | 1.4365 | 0.7920 | 1.0405 |
| 11 | 12.2 | 16.8 | 1.5062 | 0.8853 | 1.0636 |
| 12 | 6.1 | 22.9 | 1.5155 | 0.8988 | 1.0661 |
| 13 | 6.7 | 29.6 | 1.5293 | 0.9194 | 1.0696 |
| 14 | 10.3 | 39.9 | 1.5380 | 0.9344 | 1.0708 |
| 15 | 18.7 | 58.6 | 1.5458 | 0.9473 | 1.0722 |
| 16 | 12.5 | 71.1 | 1.5558 | 0.9649 | 1.0733 |
| 17 | 19.8 | 90.9 | 1.5626 | 1.0060 | 1.0596 |
| Bottoms 9.1 [1] | | | 1.5613 | 1.0222 | 1.0502 |

[1] Includes bottoms from chromatogram in Table V.
[2] Refractivity intercept.

Fractions 5 through 8 from the run described in Table V, and 13 through 17 from the run described in Table VI were combined and subjected to a second chromatographic separation. The results are shown in Table VII.

TABLE VII

Rechromatographic fractionation of composite fraction

| Cut No. | Vol. Percent of— | | $n_D^{25}$ | $d_4^{25}$ | RI [b] | Indene Content, Percent | Bromine No. |
|---|---|---|---|---|---|---|---|
| | Fraction | Original | | | | | |
| A₁ | 9.5 | 5.9 | 1.4965 | 0.8679 | 1.0625 | | |
| A₂ | 6.3 | 3.9 | 1.5154 | 0.9011 | 1.0648 | 28 | 8.7 |
| A₃ | 7.6 | 4.8 | 1.5244 | 0.9128 | 1.0679 | 38 | |
| A₄ | 3.1 | 1.9 | 1.5428 | 0.9417 | 1.0719 | 60 | |
| A₅ | 6.9 | 4.3 | 1.5532 | 0.9579 | 1.0741 | 73 | |
| A₆ | 20.0 | 12.9 | 1.5624 | 0.9727 | 1.0759 | 85 | |
| A₇ | 14.3 | 8.9 | 1.5679 | 0.9850 | 1.0752 | 92 | |
| A₈ | 23.8 | 14.9 | 1.5659 | 1.0124 | 1.0595 | 75 | |
| A₉ [a] | 1.4 | 0.9 | 1.5592 | 1.0369 | 1.0408 | | |
| Loss | 6.5 | 4.1 | | | | | |

[a] Recovered from alcohol eluted material.
[b] Refractivity intercept.

Fractions A₄ to A₇ from Table VII were then combined and subjected to a third chromatographic separation. The results of this are shown in Table VIII.

TABLE VIII

Triple chromatogram of chromatographic fractions

| Cut No. | Vol., ml. | Vol. Percent of— | | $n_D^{25}$ | $d_4^{25}$ | RI [1] | Indene Content, Percent |
|---|---|---|---|---|---|---|---|
| | | Fraction | Original | | | | |
| B₁ | 14 | 4.5 | 1.3 | 1.5039 | 0.8819 | 1.0630 | 14 |
| B₂ | 15 | 4.8 | 1.3 | 1.5241 | 0.9126 | 1.0678 | 38 |
| B₃ | 18 | 5.7 | | 1.5521 | 0.9563 | 1.0740 | 72 |
| B₄ | 143 | 45.5 | 24.3 | 1.5634 | 0.9741 | 1.0763 | 86 |
| B₅ | 80 | 25.5 | | 1.5691 | 0.9845 | 1.0768 | 94 |
| B₆ | 32 | 10.2 | | 1.5684 | 0.9915 | 1.0727 | 85-90 |
| Loss | 12 | 3.8 | 1.1 | | | | |

[1] Refractivity intercept.

Fractions B₃ to B₆ were composited representing 65% of the indene in the original naphtha and being of 85% purity. The combined fractions were fractionally distilled in the 100-plate column at 100 mm. pressure with a 10-12 ml./hr. takeoff. The results are shown in Table IX.

TABLE IX

Fractional distillation of composite sample obtained from triple chromatogram

| Fraction | Boiling Point,[a] °C. | Wt., g. | Percent Wt. | $n_D^{25}$ | $d_4^{25}$ | RI [b] |
|---|---|---|---|---|---|---|
| 1 | 152-173 | 12.6 | 8.2 | 1.52217 | 0.9096 | 1.0674 |
| 2 | 173-180 | 9.1 | 5.9 | 1.55412 | 0.9636 | 1.0723 |
| 3 | 180-181 | 49.4 | 32.5 | 1.57147 | 0.9905 | 1.0762 |
| 4 | 181-182 | 45.5 | 29.9 | 1.57358 | 0.9912 | 1.0780 |
| 5 | 182 | 25.1 | 16.4 | 1.57360 | 0.9913 | 1.0780 |
| 6 | 182-233 | 2.8 | 1.3 | | | |
| Bottoms and loss | | | 5.8 | | | |

[a] Boiling points calculated to 760 mm. pressure.
[b] Refractivity intercept.

Fractions 4 and 5 are essentially pure indene and account for 40% of the indene in the original naphtha. Fraction 3 is greater than 95% purity. These three fractions represent about 60% of the indene in the original naphtha and are for all practical purposes pure indene.

The advantages of the chromatographic separation followed by fractional distillation are shown in summary Table X.

TABLE X

| | Naphtha A | |
|---|---|---|
| | Recovery, Percent | Purity |
| Charge | 100 | ≈40 |
| Product: | | |
| Fract. Distn. | 20 | 75 |
| Single Chromatogram | 20 | 80 |
| | 51.3 | 76 |
| Single Chromatogram + Distillation | 60 | 95 |
| Double Chromatogram | 20.8 | 88 |
| | 40.9 | 80 |
| Triple Chromatogram | 65 | 85 |
| Triple Chromatogram + Distillation | 60 | ≈100 |

EXAMPLE III

Another naphtha containing 68% indene was subjected to a single chromatographic fractionation. A fraction representing 72.5% of the naphtha and containing about 75% indene was recovered. This was fractionally distilled to produce a fraction amounting to 46.8% of the original naphtha and containing about 97% indene. Another fraction representing 8% of the naphtha contained 93% indene. Together these represented a total recovery of 79% of the indene of greater than 95% purity.

Rechromatographing the non-hydrocarbon fraction followed by fractional distillation of the two fractions obtained yielded 1.8% coumarone, 4.4% methyl coumarone and 1.4% benzonitrile, based on the original naphtha.

EXAMPLE IV

Another naphtha containing about 70% indene could be fractionally distilled to yield 52.4% of a cut containing 95% indene, this representing an 83% recovery of the indene in the distillate. When using a single chromatographic fractionation followed by distillation two fractions of about 99% purity and another of about 94% were obtained. The three combined represented a 90% recovery of indene of greater than 95% purity.

The non-hydrocarbon fraction was subjected to a second chromatographic fractionation. Two of the fractions obtained were fractionally distilled yielding 3.5% coumarone, 0.5% methyl coumarone and 0.3% benzonitrile. These values are calculated on the original naphtha.

One of the fractions of this naphtha from the chromatographic fractionation contained styrene and substituted styrenes in rather high concentration. These amounted to 6.1% and 4.1% respectively, of the original naphtha. The other naphthas used contained no styrene.

Similar results have been obtained using activated alumina. Activated alumina adsorbs the nitriles more strongly than does silica gel. Consequently it may be desirable in some instances to first pass the naphtha through activated alumina to concentrate the nitriles and other non-hydrocarbon components. In this case a relatively high liquid to adsorbent ratio is used. The exact ratio will vary depending on the proportions of the non-hydrocarbons present, and upon the degree of separation desired. After the treatment with alumina, the chromatographic fractionation, as previously described, can be carried out using either silica gel, activated alumina or other suitable adsorbent. The preliminary treatment can also be carried out using silica gel in a like manner.

We claim as our invention:

1. A process for separating indene of high purity from a naphtha fraction boiling predominantly in the range of 160–200° C. and composed essentially of a complex mixture of aromatic hydrocarbons including methyl benzenes, indane, and other aromatic hydrocarbons normally present in coal tar naphtha fractions of this boiling range, and polymerizable constituents other than indene, in which indene is the predominant single hydrocarbon and is present in at least about 35% by volume of the naphtha fraction, which comprises contacting said naphtha fraction with an adsorbent selected from the group consisting of silica gel, activated alumina, and activated carbon in an adsorption zone, selectively adsorbing an indene-rich fraction, desorbing the adsorbed material from the adsorbent, and recovering a fraction of relatively low indene content and a fraction rich in indene.

2. A process for separating indene of high purity from a naphtha fraction boiling predominantly in the range of 160–200° C. and composed essentially of a complex mixture of aromatic hydrocarbons including methyl benzenes, indane, and other aromatic hydrocarbons normally present in coal tar naphtha fractions of this boiling range, and polymerizable constituents other than indene, in which indene is the predominant single hydrocarbon and is present in at least about 35% by volume of the naphtha fraction, which comprises contacting said naphtha fraction with an adsorbent selected from the group consisting of silica gel, activated alumina, and activated carbon in an adsorption zone, selectively adsorbing an indene-rich fraction, desorbing the adsorbed material from the adsorbent, recovering a fraction of relatively low indene content and a fraction rich in indene, and thereafter fractionally distilling said indene-rich fraction and recovering a product of increased indene content, said product containing the major portion of the indene contained in the original naphtha fraction.

3. The process of claim 2 wherein the indene content of said product is greater than about 95% by weight.

4. The process of claim 1 wherein the indene-rich fraction is subjected to a second adsorption step with said adsorbent, the adsorbed material is desorbed, a fraction of relatively low indene content is recovered and a second fraction is recovered which is richer in indene than the indene-rich fraction charged to said second adsorption step.

5. The process of claim 4 wherein the indene-rich product from said second adsorption step is subjected to fractional distillation and a product of greater indene content is recovered.

6. The process of claim 1 wherein a first fraction of low indene content is recovered, a second fraction of intermediate indene content is recovered, and a third fraction of high indene content is recovered, the fraction of intermediate indene content is subjected to a second adsorption step, the adsorbed material from the second adsorption step is desorbed, a fraction of low indene content and another fraction of high indene content is recovered as a product.

7. The process of claim 7 wherein said third fraction and the high indene content fraction from said second adsorption step are subjected to fractional distillation, and a product of enhanced indene content is recovered from said distillation step.

References Cited in the file of this patent

UNITED STATES PATENTS

| | | |
|---|---|---|
| 2,395,491 | Mavity | Feb. 26, 1946 |
| 2,398,101 | Lipkin | Apr. 9, 1946 |
| 2,509,486 | Danforth | May 30, 1950 |
| 2,518,236 | Hirschler | Aug. 8, 1950 |
| 2,756,197 | Thorpe et al. | July 24, 1956 |
| 2,763,701 | Hoffman et al. | Sept. 18, 1956 |
| 2,768,221 | Findlay | Oct. 23, 1956 |

OTHER REFERENCES

Mair et al.: J. Research, Nat. Bur. of Standards, volume 32 (1944), paper No. 1583, pages 165–183 (page 183 only needed).

Karrer.: "Organic Chemistry," 2nd ed., 1946, pages 896 and 897, Elsevier Pub. Co., New York.

Smit.: Anal., Chim. Acta, volume 2 (1948), pages 671–680 (pages 671 and 675–678 needed).

Kikkawa et al.: J. Chem. Soc. Japan, Ind. Chem. Sec., volume 55 (1952), pages 100–101 (abstracted in Chem. Abstracts, volume 47 (1953), column 10203h.

Hydrocarbons From Petroleum, pages 161 to 167 (1953), pub. Waverly Press, Baltimore, Md.

Entel et al.: "Analytical Chemistry," volume 25, April 1953, pages 616–618.

Cullis et al.: "Chemistry and Industry," Sept. 7, 1957, pages 1212–1214.